United States Patent
Enomoto et al.

(10) Patent No.: US 11,465,318 B2
(45) Date of Patent: Oct. 11, 2022

(54) GLOVE, COMPOSITION FOR DIP MOLDING, AND METHOD FOR PRODUCING GLOVE

(71) Applicant: Midori Anzen Co., Ltd., Tokyo (JP)

(72) Inventors: Norihide Enomoto, Tokyo (JP); Taichi Ogawa, Tokyo (JP); Kaname Shibata, Tokyo (JP); Junji Shibasaki, Tokyo (JP)

(73) Assignee: Midori Anzen Co., Ltd., Tokyo (JP)

( * ) Notice: Subject to any disclaimer, the term of this patent is extended or adjusted under 35 U.S.C. 154(b) by 486 days.

(21) Appl. No.: 16/347,597

(22) PCT Filed: Nov. 20, 2018

(86) PCT No.: PCT/JP2018/042788
§ 371 (c)(1),
(2) Date: May 6, 2019

(87) PCT Pub. No.: WO2019/102985
PCT Pub. Date: May 31, 2019

(65) Prior Publication Data
US 2021/0162636 A1   Jun. 3, 2021

(30) Foreign Application Priority Data

Nov. 24, 2017 (JP) ............................. JP2017-226274
Dec. 28, 2017 (JP) ............................. JP2017-253478

(51) Int. Cl.
| | |
|---|---|
| *B29C 41/14* | (2006.01) |
| *A41D 19/00* | (2006.01) |
| *B29C 41/00* | (2006.01) |
| *C08F 20/44* | (2006.01) |
| *C08G 59/32* | (2006.01) |
| *C08J 5/02* | (2006.01) |
| *C08F 236/12* | (2006.01) |
| *B29K 33/20* | (2006.01) |
| *B29L 31/48* | (2006.01) |
| *C08K 5/1515* | (2006.01) |

(52) U.S. Cl.
CPC .............. *B29C 41/14* (2013.01); *A41D 19/00* (2013.01); *A41D 19/0055* (2013.01); *A41D 19/0058* (2013.01); *B29C 41/003* (2013.01); *C08F 20/44* (2013.01); *C08F 236/12* (2013.01); *C08G 59/32* (2013.01); *C08J 5/02* (2013.01); *A41D 2500/54* (2013.01); *B29K 2033/20* (2013.01); *B29L 2031/4864* (2013.01); *C08K 5/1515* (2013.01)

(58) Field of Classification Search
None
See application file for complete search history.

(56) References Cited

U.S. PATENT DOCUMENTS

| | | |
|---|---|---|
| 6,384,139 B1 | 5/2002 | Ho et al. |
| 2012/0022221 A1 | 1/2012 | Hidalgo et al. |
| 2013/0198933 A1 | 8/2013 | Khoo et al. |
| 2018/0030216 A1 | 2/2018 | Emori et al. |
| 2019/0112436 A1* | 4/2019 | Holzner ..................... C08J 5/02 |

FOREIGN PATENT DOCUMENTS

| | | | |
|---|---|---|---|
| CN | 1225108 A | 8/1999 | |
| CN | 107207746 A | 9/2017 | |
| EP | 2622976 A1 | 8/2013 | |
| EP | 3575357 A1 | 12/2019 | |
| JP | 2012-522860 A | 9/2012 | |
| JP | 5275520 B2 | 8/2013 | |
| WO | WO-2016/013666 A1 | 1/2016 | |
| WO | WO-2017/126660 A1 | 7/2017 | |
| WO | WO-2017126660 A1 * | 7/2017 | ............. A41D 19/00 |
| WO | WO-2017/147638 A1 | 9/2017 | |
| WO | WO-2017147638 A1 * | 9/2017 | ......... A41D 19/0062 |
| WO | WO-2017/170049 A1 | 10/2017 | |

OTHER PUBLICATIONS

WO2017126660 English Machine Translation, prepared Jan. 28, 2022. (Year: 2022).*
International Preliminary Report on Patentability and Written Opinion in International Application No. PCT/JP2018/042788 dated Jun. 4, 2020, 8 pages.
Extended European Search Report in EP Application No. 18867324.8 dated Jun. 9, 2020, 6 pages.
Office Action in CN Application No. 201880004282.9 dated Apr. 21, 2021, 18 pages.
Search Report and Written Opinion in International Application No. PCT/JP2018/042788 dated Feb. 26, 2019, 6 pages.
Office Action in CN Application No. 201880004282.9 dated Oct. 23, 2020, 22 pages.
Chunpu et al., "Synthetic Resin", China Construction Industry Press, Dec. 31, 1979, 7 pages (relevant pp. 228-229).
Jinping et al., "Handbook of Plastics Industry", Chemical Industry Press, Oct. 31, 2001, 7 pages (relevant pp. 778-780).

* cited by examiner

*Primary Examiner* — Christopher M Rodd
(74) *Attorney, Agent, or Firm* — Marshall, Gerstein & Borun LLP

(57) ABSTRACT

A glove including a cured film of an elastomer containing a (meth)acrylonitrile-derived structural unit, an unsaturated carboxylic acid-derived structural unit and a butadiene-derived structural unit in a polymer main chain, wherein the elastomer contains 20 to 40% by weight of a (meth)acrylonitrile-derived structural unit, 1 to 10% by weight of an unsaturated carboxylic acid-derived structural unit and 50 to 75% by weight of a butadiene-derived structural unit, and has a crosslinked structure of a carboxyl group in the unsaturated carboxylic acid-derived structural unit with an epoxy crosslinker containing an epoxy compound having three or more epoxy groups in one molecule.

9 Claims, 2 Drawing Sheets

GLOVE, COMPOSITION FOR DIP MOLDING, AND METHOD FOR PRODUCING GLOVE

TECHNICAL FIELD

The present invention relates to a glove including a cured film of an elastomer having a crosslinked structure of a carboxyl group in an unsaturated carboxylic acid-derived structural unit with an epoxy crosslinker containing an epoxy compound without any sulfur crosslinker and any sulfur-based vulcanization accelerator, and a composition for dip molding and a method for producing a glove.

BACKGROUND ART

Conventionally, gloves produced by dip molding of a latex composition obtained by crosslinking with sulfur and a thiazole-based, sulfur-based vulcanization accelerator have been widely used in, for example, various industrial fields and medical fields. However, sulfur crosslinkers and sulfur-based vulcanization accelerators cause the IV-type allergy, and thus a vulcanization accelerator-free glove has been proposed where neither a sulfur crosslinker nor a sulfur-based vulcanization accelerator is used. Such a glove is classified to a self-crosslinking type glove obtained by allowing an organic crosslinkable compound to be included during latex polymerization and an external crosslinker type glove obtained by crosslinking with carbodiimide or an epoxy crosslinker. Such a vulcanization accelerator-free glove has been proposed in Patent document 1 with respect to a self-crosslinking type, and in Patent document 2 with respect to an external crosslinking type by use of an epoxy crosslinker. However, the details of epoxy-crosslinked gloves have not been almost studied. Furthermore, some epoxy-crosslinked gloves have been already productized. However, all such gloves productized have not exceeded conventional sulfur-crosslinked XNBR gloves in terms of performances. Commercially available epoxy-crosslinked gloves also currently have many problems in terms of performances and production.

The present invention relates to an improvement of a glove obtained by crosslinking with an epoxy crosslinker.

CITATION LIST

Patent Documents

[Patent document 1] JP 5275520 B
[Patent document 2] WO 2017/126660

SUMMARY OF INVENTION

Technical Problem

The greatest problem in production of a glove with an epoxy crosslinker by dip molding is deactivation of an epoxy group derived from an epoxy compound contained in an epoxy crosslinker due to a reaction with water in a dipping liquid. Hereinafter, such a glove produced with an epoxy crosslinker is also simply referred to as "epoxy-crosslinked glove". A crosslinked structure produced by ring-opening polymerization of an epoxy group derived from an epoxy compound contained in an epoxy crosslinker is also simply referred to as "epoxy-crosslinked". Thus, current epoxy-crosslinked gloves have the problem of not exhibiting desired performances, in particular, not exhibiting any desired fatigue durability (having a short usable time) even when produced after an extremely short storage period.

An epoxy crosslinker as an organic crosslinker has been originally expected to be high in fatigue durability, instead of a sulfur crosslinker. In this case, the tensile strength is considered to be kept by any other crosslinked structure such as calcium- and zinc-crosslinked structures. The present inventors have made various studies about the amount of an epoxy crosslinker, for example, the amount thereof added, the influence of a molecular weight, the valence of an epoxy group, the structure of an epoxy compound, the structure related to affinity of an epoxy group with water, XNBR for protection of an epoxy group from water, and the like, and thus have set, as an object, production of an epoxy-crosslinked glove having a high fatigue durability and have made studies about various conditions. Another object of the present invention is to produce a thin glove not conventionally obtained, by use of a crosslinker in an amount as small as possible.

Solution to Problem

Embodiments of the present invention relate to a glove, a composition for dip molding, and a method for producing a glove, described below.

[1] A glove including a cured film of an elastomer containing a (meth)acrylonitrile-derived structural unit, an unsaturated carboxylic acid-derived structural unit and a butadiene-derived structural unit in a polymer main chain, wherein the elastomer contains 20 to 40% by weight of a (meth)acrylonitrile-derived structural unit, 1 to 10% by weight of an unsaturated carboxylic acid-derived structural unit and 50 to 75% by weight of a butadiene-derived structural unit, and has a crosslinked structure of a carboxyl group in the unsaturated carboxylic acid-derived structural unit with an epoxy crosslinker containing an epoxy compound having three or more epoxy groups in one molecule.

[2] The glove according to [1], wherein the elastomer further has a crosslinked structure of an unsaturated carboxylic acid-derived carboxyl group with calcium derived from a coagulant, and a crosslinked structure of such a carboxyl group with zinc and/or aluminum derived from a metal crosslinker.

[3] The glove according to [1] or [2], wherein the epoxy compound is an epoxy compound having three or more glycidyl ether groups in one molecule.

[4] The glove according to any one of [1] to [3], wherein the epoxy crosslinker has an average number of epoxy groups of more than 2.0.

[5] The glove according to any one of [1] to [4], wherein the epoxy crosslinker has an epoxy equivalent of 100 g/eq. or more and 200 g/eq. or less.

[6] The glove according to any one of [1] to [5], wherein the cured film has a thickness of 40 to 300 μm.

[7] The glove according to any one of [1] to [6], wherein the cured film has a fatigue durability of 240 minutes or more and the cured film has a tensile strength of 20 MPa or more, according to the following test methods:

fatigue durability test method: including preparing a No. 1 dumbbell test piece according to JIS K6251, having a length of 120 mm, from the cured film, and repeating pulling of an upper portion of the test piece with a lower portion of the test piece being secured and dipped to a length of 60 mm in an artificial sweat liquid, and expansion and contraction of the resultant between a maximum of 195 mm and a minimum of 147 mm over 12.8 seconds in a longitudinal direction, thereby measuring a time until breakage of the test piece; and tensile strength test method: including cutting out a No. 5 dumbbell test piece according to JIS K6251, from the cured film, and measuring a tensile strength (MPa) with TENSILON universal tensile testing machine RTC-1310A manufactured by A&D Co., Ltd., at a test speed of 500 mm/min., a distance between chucks of 75 mm and a distance between marked lines of 25 mm.

[8] A composition for dip molding, including an elastomer containing an (meth)acrylonitrile-derived structural unit, an unsaturated carboxylic acid-derived structural unit and a butadiene-derived structural unit in a polymer main chain, an epoxy crosslinker, water, and a pH adjuster, and having an adjusted pH of 9.0 or more, wherein the elastomer contains 20 to 40% by weight of a (meth)acrylonitrile-derived structural unit, 1 to 10% by weight of an unsaturated carboxylic acid-derived structural unit and 50 to 75% by weight of a butadiene-derived structural unit, and the epoxy crosslinker is an epoxy crosslinker containing an epoxy compound having three or more epoxy groups in one molecule.

[9] The composition for dip molding according to [8], wherein the amount of the epoxy crosslinker added in the composition for dip molding is 0.2 parts by weight or more and 5.0 parts by weight or less based on 100 parts by weight of the elastomer included in the composition for dip molding.

[10] The composition for dip molding according to [8] or [9], further including zinc oxide and/or an aluminum complex as a metal crosslinker.

[11] The composition for dip molding according to any one of [8] to [10], wherein the amount of the metal crosslinker added to the composition for dip molding according to [10] is 0.2 to 4.0 parts by weight based on 100 parts by weight of the elastomer.

[12] The composition for dip molding according to any one of [8] to [11], wherein the epoxy compound is an epoxy compound having three or more glycidyl ether groups in one molecule.

[13] The composition for dip molding according to any one of [8] to [12], wherein the epoxy crosslinker has an average number of epoxy groups of more than 2.0.

[14] The composition for dip molding according to any one of [8] to [13], wherein the epoxy crosslinker has an epoxy equivalent of 100 g/eq. or more and 200 g/eq. or less.

[15] A method for producing a glove, including (1) a step of dipping a glove mold in a calcium ion-containing coagulant liquid to attach the coagulant to the glove mold, (2) a step of dispersing and uniforming the composition for dip molding according to any of [8] to [14] with stirring (maturation step), (3) a dipping step of dipping the glove mold to which the coagulant is attached according to (1), in the composition for dip molding which undergoes step (2), to coagulate the composition for dip molding on the glove mold, thereby forming a film, (4) a step of gelling the film formed on the glove mold to produce a cured-film precursor, the step being a gelling step of leaving the film to still stand in conditions of a temperature of 21° C. to 120° C. and 20 seconds or more, (5) a leaching step of removing impurities from the cured-film precursor formed on the glove mold, (6) a beading step of producing a wind on a glove cuff portion after the leaching step, and (7) a curing step of finally heating and drying the cured-film precursor at 70° C. or higher and 150° C. or lower for 10 minutes to 30 minutes, to provide a cured film, wherein steps (3) to (7) are performed in the recited order.

[16] The method for producing a glove according to [15], wherein steps (3) and (4) are repeated twice in the recited order.

[17] The method for producing a glove according to [15] or [16], further including a pre-curing step of heating and drying the cured-film precursor at a temperature lower than the temperature in step (7), between steps (6) and (7).

Effects of Invention

The epoxy-crosslinked glove of the present invention is obtained using an epoxy crosslinker containing an epoxy compound having three or more epoxy groups in one molecule. While the fatigue durability of a glove obtained using a conventional divalent epoxy crosslinker has been at most 200 minutes, the glove of the present invention exhibits a fatigue durability of at least 400 minutes or more and can exhibit a high fatigue durability of 1000 minutes or more depending on the epoxy crosslinker.

Such sufficient performances can be obtained even in the case of production of 2.7 g of an ultrathin glove (thickness: 50 µm).

In addition, use of the composition for dip molding of the present invention can produce a glove having favorable performances even in the case of storage for the least 24 hours or more industrially required, although use of a composition for dip molding, to which a conventional epoxy crosslinker is added, cannot provide any glove having sufficient performances by dip molding after storage for 24 hours and such a glove has a short pot life (usable time) which is the biggest weakness of an epoxy-crosslinked glove.

DESCRIPTION OF EMBODIMENTS

Figure 1:
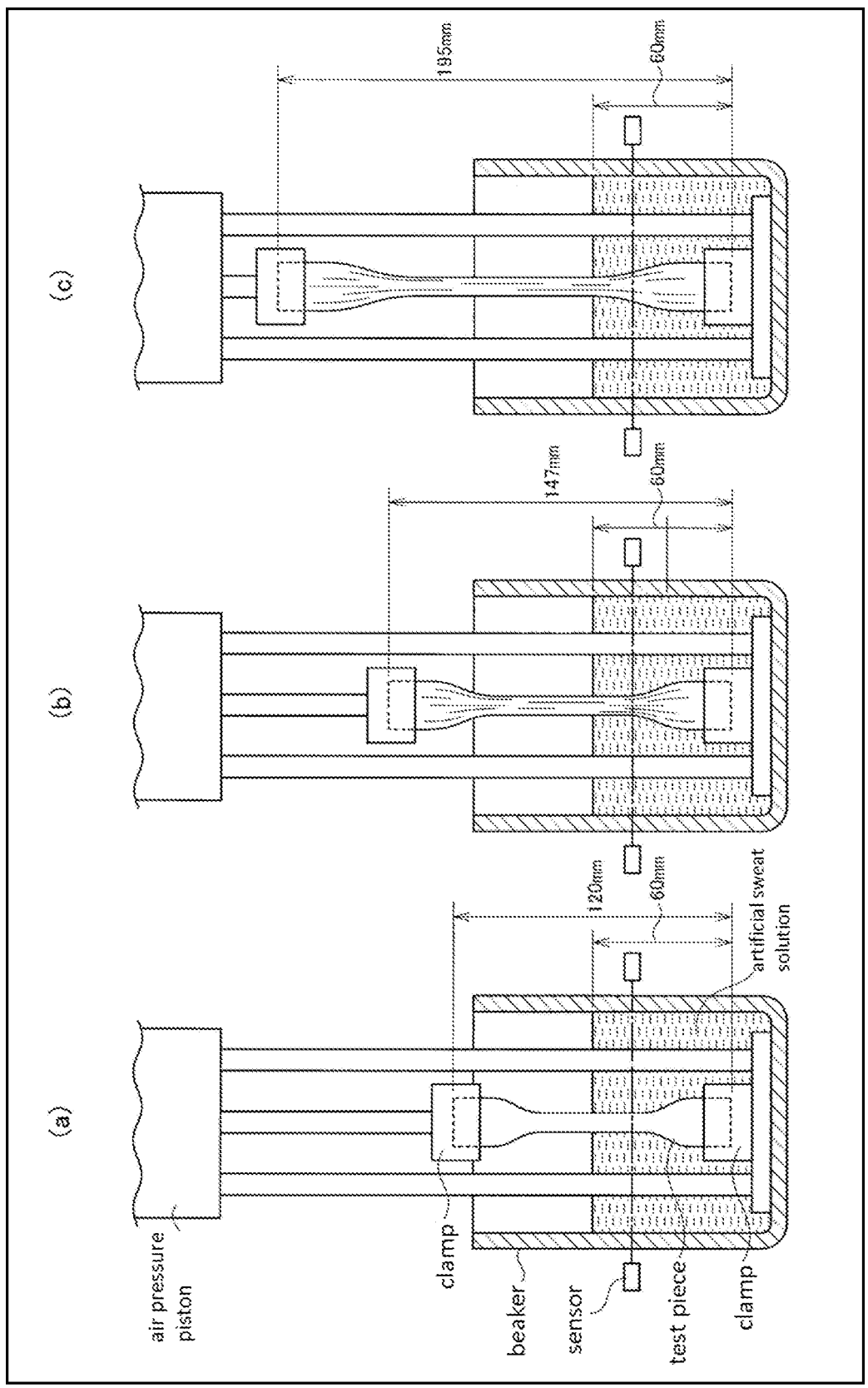
FIG. 1 illustrates a cross-sectional view schematically illustrating one example of a fatigue durability testing apparatus.

Hereinafter, preferable embodiments of the present invention will be described, but it is obvious that the present invention is not limited to such embodiments and may be variously modified and altered. Herein, the descriptions "weight" and "mass" are used in the same meaning, and hereinafter are unified to "weight".

The "fatigue durability" herein means resistance of a glove against breakage due to degradation in performances by sweat of a user (operator). A specific evaluation method is described below.

While a glove is usually easily broken at a finger crotch part thereof and thus a fatigue durability of more than 90 minutes at such a finger crotch part is defined as an acceptance line for practical use, in the present invention, the fatigue durability of the film obtained by preparing on a porcelain panel, and the fatigue durability is equivalent to the fatigue durability at a palm part. The fatigue durability at a palm part is obtained by converting the fatigue durability at a finger crotch part according to the following expression.

(fatigue durability(min.) at palm+21.43)/2.7928= fatigue durability(min.) at finger crotch   Expression 5

Accordingly, the acceptance line in a fatigue durability test in the present invention is defined as 240 minutes. In addition, in the present invention, the tensile strength is represented by MPa, corresponds to a value obtained by dividing the force at break (N) by the cross-sectional area of a test piece and also corresponds to a numerical value obtained by removing the effect of thickness, and the acceptance line thereof is defined as 20 MPa in more than 3.2 g to 4.5 g of a usual thin glove (thickness: more than 60 μm to 90 μm).

On the other hand, the basis according to the EN standard is a force at break of 6 N, and a level of more than 35 MPa is demanded in 2.7 to 3.2 g of an ultrathin glove (thickness: 50 to 60 μm) to be provided according to another object of the present invention.

1. Composition for Dip Molding

The composition for dip molding of the present embodiment includes at least an elastomer raw material (hereinafter, also referred to as "elastomer") containing a (meth)acrylonitrile (acrylonitrile or methacrylonitrile)-derived structural unit, an unsaturated carboxylic acid-derived structural unit and a butadiene-derived structural unit in a polymer main chain, an epoxy crosslinker containing an epoxy compound having three or more epoxy groups in one molecule, a pH adjuster, and water.

The composition for dip molding can be particularly preferably used as a dipping liquid for gloves.

The composition for dip molding optionally does not include a metal crosslinker, such as zinc oxide, as an essential component. In this regard, such a composition including a calcium ion-containing coagulant can be used to thereby allow particularly a thick glove (thickness: about 300 μm) for cooking and a glove for clean rooms, where metal elution is not desirable, to keep tensile strength by calcium crosslinking due to the coagulant even in no inclusion of any metal crosslinker such as zinc oxide. Thus, crosslinking due to a metal crosslinker such as zinc oxide optionally is not present. On the other hand, such crosslinking due to a metal crosslinker, such as zinc crosslinking, is currently preferably present in, in particular, a thin glove from the viewpoints of strength, chemical impermeability, and deterioration in strength in an artificial sweat liquid. Such viewpoints are described below.

<Elastomer>

The elastomer contains at least a (meth)acrylonitrile-derived structural unit, an unsaturated carboxylic acid-derived structural unit and a butadiene-derived structural unit in a polymer main chain. The elastomer is designated as "carboxylated (meth)acrylonitrile-butadiene elastomer" or also simply designated as "XNBR". A glove obtained by use of XNBR as the elastomer is also simply referred to as "XNBR glove".

The ratio among the respective structural units is as follows in order to produce a glove. The elastomer contains a (meth)acrylonitrile-derived structural unit, namely, a (meth)acrylonitrile residue in the range from 20 to 40% by weight, an unsaturated carboxylic acid-derived structural unit, namely, an unsaturated carboxylic acid residue in the range from 1 to 10% by weight, and a butadiene-derived structural unit, namely, a butadiene residue in the range from 50 to 75% by weight. The ratio among such structural units can be conveniently determined from the weight ratio among raw materials used for production of the elastomer.

The (meth)acrylonitrile-derived structural unit is a component mainly imparting strength to a glove, and a too low ratio thereof causes insufficient strength and a too high ratio thereof enhances chemical resistance, but causes a too high hardness. The ratio of the (meth)acrylonitrile-derived structural unit in the elastomer is more preferably 25 to 40% by weight. While the ratio of such a (meth)acrylonitrile-derived structural unit in a conventional XNBR glove has been usually 25 to 30% by weight, XNBR has been recently developed where the ratio is 30% by weight or more to result in an enhancement in strength and also favorable elongation, and thus is effective for production of an ultrathin glove. The amount of the (meth)acrylonitrile-derived structural unit can be determined by conversion of the amount of a nitrile group from the amount of a nitrogen atom determined according to elemental analysis.

The butadiene-derived structural unit is a component mainly imparting flexibility to a glove, and a ratio of less than 50% by weight thereof usually causes the loss of flexibility. The ratio of the butadiene-derived structural unit in the elastomer is more preferably 55 to 70% by weight, particularly preferably about 60% by weight.

The amount of the unsaturated carboxylic acid-derived structural unit is preferably 1 to 10% by weight, more preferably 1 to 9% by weight, still more preferably 1 to 6% by weight in order to provide a proper crosslinked structure and allow physical properties of a glove as a final product to be kept. The amount of the unsaturated carboxylic acid-derived structural unit can be determined by quantitatively determination of a carboxyl group and a carboxyl group-derived carbonyl group by infrared spectroscopy (IR) or the like.

The unsaturated carboxylic acid forming the unsaturated carboxylic acid-derived structural unit is not particularly limited and may be a monocarboxylic acid or a polycarboxylic acid. More specific examples include acrylic acid, methacrylic acid, crotonic acid, maleic acid and fumaric acid. In particular, acrylic acid and/or methacrylic acid (hereinafter, referred to as "(meth)acrylic acid".) are/is preferably used, and methacrylic acid is more preferably used.

The butadiene-derived structural unit is preferably a 1,3-butadiene-derived structural unit.

The polymer main chain preferably contains substantially the (meth)acrylonitrile-derived structural unit, the unsaturated carboxylic acid-derived structural unit and the butadiene-derived structural unit, and may contain any other polymerizable monomer-derived structural unit.

Such any other polymerizable monomer-derived structural unit is preferably contained in the elastomer in an amount of 30% by weight or less, more preferably 20% by weight or less, further preferably 15% by weight or less.

Examples of a preferably usable polymerizable monomer include aromatic vinyl monomers such as styrene, α-methylstyrene and dimethylstyrene; ethylenically unsaturated carboxylic acid amides such as (meth)acrylamide and N,N-dimethylacrylamide; ethylenically unsaturated carboxylic acid alkyl ester monomers such as methyl (meth)acrylate, ethyl (meth)acrylate, butyl (meth)acrylate and 2-ethylhexyl (meth)acrylate; and vinyl acetate. These can be arbitrarily used singly or in combination of a plurality of kinds thereof.

The elastomer can be prepared by emulsion polymerization with (meth)acrylonitrile, an unsaturated carboxylic acid such as (meth)acrylic acid, butadiene such as 1,3-butadiene, and, if necessary, any other polymerizable monomer by use of an emulsifier, a polymerization initiator, a molecular weight modifier, and the like usually used, according to an ordinary method.

A solid content in water during the emulsion polymerization is preferably contained in an amount of 30 to 60% by weight, and the solid content is more preferably contained in an amount of 35 to 55% by weight.

The emulsion polymerization liquid after synthesis of the elastomer can be used as an elastomer component of the composition for dip molding, as it is.

Examples of the emulsifier include anionic surfactants such as dodecyl benzene sulfonate and aliphatic sulfonate; and nonionic surfactants such as polyethylene glycol alkyl ether and polyethylene glycol alkyl ester, and such any anionic surfactant is preferably used.

The polymerization initiator is not particularly limited as long as it is a radical initiator, and examples may include inorganic peroxides such as ammonium persulfate and potassium superphosphate; organic peroxides such as t-butyl peroxide, cumene hydroperoxide, p-menthane hydroperoxide, t-butylcumyl peroxide, benzoyl peroxide, 3,5,5-trimethylhexanoyl peroxide and t-butyl peroxyisobutyrate; and azo compounds such as azobisisobutyronitrile, azobis-2,4-dimethylvaleronitrile, azobiscyclohexanecarbonitrile and azobismethylisobutyrate.

Examples of the molecular weight modifier include mercaptans such as t-dodecyl mercaptan and n-dodecyl mercaptan, and halogenated hydrocarbons such as carbon tetrachloride, methylene chloride and methylene bromide, and mercaptans such as t-dodecyl mercaptan and n-dodecyl mercaptan are preferable.

An elastomer suitable for use in an epoxy-crosslinked glove according to an embodiment of the present invention is described below in terms of characteristics thereof.

(1) Selection of Elastomer Depending on Mooney Viscosity $(ML_{(1+4)}$ (100° C.))

The glove is obtained by crosslinking a corresponding portion where a crosslinked portion with various crosslinkers is removed, with calcium as a coagulant (in the case of use of a calcium ion-containing coagulant). In the case of no use of any metal crosslinker in the present invention, tensile strength is retained by calcium crosslinking.

The tensile strength by calcium crosslinking has been found to be almost proportional to the level of the Mooney viscosity of an elastomer. In the case of no epoxy crosslinking performed, the tensile strength is about 15 MPa in the case of use of an elastomer having a Mooney viscosity of 80, and the tensile strength is about 20 MPa in the case of use of an elastomer having a Mooney viscosity of 100. Accordingly, it is suitable to select an elastomer having a Mooney viscosity of about 100 to 150.

The upper limit of the Mooney viscosity is approximately 220 because the measurement limit of the Mooney viscosity by itself is 220 and a too high Mooney viscosity causes a problem about moldability. On the other hand, an elastomer having a too low Mooney viscosity exhibits only insufficient tensile strength.

(2) Linear Elastomer Chain Less Branched

A linear elastomer less branched in an elastomer chain is suitable in order to allow an epoxy crosslinker including an epoxy compound higher in molecular weight than zinc and sulfur to easily penetrate into the elastomer chain. A less branched elastomer is made with various ideas in production thereof by latex manufacturers, and it is generally considered that cold rubber low in polymerization temperature (polymerization temperature: 5 to 25° C.) is more preferable than hot rubber (polymerization temperature: 25 to 50° C.).

(3) Gel Fraction (MEK-Insoluble Fraction) of Elastomer

An elastomer for use in an embodiment of the present invention is preferably lower in gel fraction.

The methyl ethyl ketone (MEK)-insoluble fraction is preferably 40% by weight or less, more preferably 10% by weight or less. It is noted that the MEK-insoluble fraction is not correlated to the tensile strength unlike the Mooney viscosity.

It can also be said that an elastomer high in the fraction of an acetone-soluble component is suitable, and it is therefore considered that the epoxy crosslinker penetrates into an elastomer particle whose inside is in a lipophilic environment and thus is protected, also resulting in an enhancement in fatigue durability of the elastomer.

(4) Water Releasability of Elastomer

The elastomer for use in an embodiment of the present invention forms a particle having a size of about 50 to 250 nm as an aqueous emulsion. The elastomer is classified to one having a relatively high affinity with water and one having a relatively low affinity with water, and a lower affinity with water results in higher easiness of extraction of water (water releasability) in such a particle and a higher water releasability results in more smooth crosslinking in such an elastomer particle.

Thus, use of XNBR high in water releasability can also result in a more reduction in crosslinking temperature.

(5) Content of Sulfur Element in Elastomer

The content of a sulfur element in the elastomer for use in an embodiment of the present invention, as detected according to a neutralization titration method of a combustion gas, is preferably 1% by weight or less based on the weight of the elastomer.

The quantitative determination of the sulfur element can be performed by a method including allowing a combustion gas generated by combustion of 0.01 g of an elastomer sample in the air at 1350° C. for 10 to 12 minutes to absorb into hydrogen peroxide water to which a mixed indicator is added, and subjecting the resultant to neutralization titration with an aqueous 0.01 N NaOH solution.

A combination of a plurality of elastomers may be included in the composition for dip molding. The content of such elastomers in the composition for dip molding is not particularly limited, and is preferably about 15 to 35% by weight, more preferably 18 to 30% by weight based on the total amount of the composition for dip molding.

<Epoxy Crosslinker>

1. Epoxy Compound

The epoxy crosslinker for use in the present invention is an epoxy crosslinker containing an epoxy compound having three or more epoxy groups in one molecule. The epoxy compound having three or more epoxy groups in one molecule is usually one having a plurality of glycidyl ether groups, and a mother skeleton having an alicyclic, aliphatic or aromatic hydrocarbon (hereinafter, also referred to as "tri- or higher-valent epoxy compound"). Examples of the tri- or higher-valent epoxy compound can preferably include an epoxy compound having three or more glycidyl ether groups in one molecule. The epoxy compound having three or more glycidyl ether groups in one molecule can be usually produced by reacting epihalohydrin with an alcohol having three or more hydroxyl groups in one molecule.

Examples of the epoxy crosslinker containing the epoxy compound having three or more epoxy groups in one molecule may include other polyglycidyl amine, polyglycidyl ester, epoxidized polybutadiene and epoxidized soybean oil.

An example of a trivalent epoxy compound is represented by the following formula (I), and an example of a divalent epoxy compound is represented by the following formula (II).

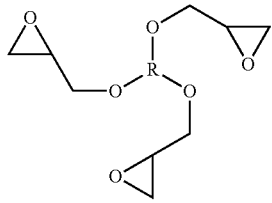
(I)

R: mother skeleton having alicyclic, aliphatic or aromatic hydrocarbon

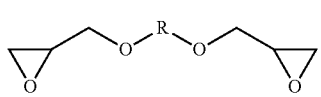
(II)

R: mother skeleton having alicyclic, aliphatic or aromatic hydrocarbon

Examples of an alcohol having three or more hydroxyl groups, forming the mother skeleton of the tri- or higher-valent epoxy compound, include aliphatic glycerol, diglycerol, triglycerol, polyglycerol, sorbitol, sorbitan, xylitol, erythritol, trimethylolpropane, trimethylolethane, pentaerythritol, aromatic cresol novolac and trishydroxyphenylmethane.

Among such tri- or higher-valent epoxy compounds, polyglycidyl ether is preferably used.

Specific examples of the polyglycidyl ether may include polyglycerol polyglycidyl ether, glycerol polyglycidyl ether, sorbitol polyglycidyl ether and trimethylolpropane polyglycidyl ether.

In particular, polyglycerol polyglycidyl ether is preferably used.

Specific examples of the polyglycerol polyglycidyl ether may include diglycerol tetraglycidyl and diglycerol triglycidyl ether.

Specific examples of the glycerol polyglycidyl ether may include glycerol triglycidyl ether.

Specific examples of the sorbitol polyglycidyl ether may include sorbitol triglycidyl ether, sorbitol tetraglycidyl ether, sorbitol pentaglycidyl ether and sorbitol hexaglycidyl ether.

Specific examples of the trimethylolpropane polyglycidyl ether may include trimethylolpropane triglycidyl ether.

Among those listed above, an epoxy crosslinker including at least any one selected from glycerol triglycidyl ether, trimethylolpropane triglycidyl ether, diglycerol triglycidyl ether, sorbitol triglycidyl ether and sorbitol tetraglycidyl ether is preferably used, and an epoxy crosslinker including at least one selected from glycerol triglycidyl ether and trimethylolpropane triglycidyl ether is further preferably used.

2. Epoxy Crosslinker

An epoxy crosslinker including an epoxy compound having a glycidyl ether group can be generally produced by reacting a hydroxyl group of an alcohol with epihalohydrin as follows. Herein, a monohydric alcohol is used for simplifying the description in the following (Ill).

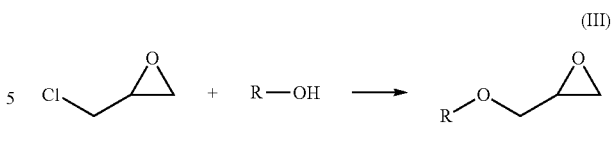
(III)

R represents a group having alicyclic, aliphatic or aromatic hydrocarbon.

The epoxy compound contained in the epoxy crosslinker is divalent to heptavalent depending on the number of hydroxyl groups in a raw material alcohol. It is noted that several compounds are produced and usually include also a divalent epoxy compound even by synthesis of a trivalent epoxy compound as an objective product, for example.

Thus, for example, a trivalent epoxy crosslinker is generally a mixture of divalent and trivalent epoxy compounds. A so-called trivalent epoxy crosslinker also usually contains a trivalent epoxy compound as a main component in an amount of about 50%.

The epoxy crosslinker is easily or hardly dissolved in water depending on the intended use, and such dissolution is largely effected by, for example, chlorine, a benzene ring, and the like that may be contained in the structure of the epoxy compound.

The epoxy crosslinker for use in the present invention usually contains a tri- or higher-valent epoxy compound obtained by a reaction of epihalohydrin with an alcohol having three or more hydroxyl groups.

More specific examples include products such as Denacol Ex-313, Ex-314, Ex-321, Ex-421, Ex-612 and Ex-614 manufactured by Nagase ChemteX Corporation, GE-30, GE-38 and GE-60 manufactured by CVC Thermoset Specialties, GE100 and GE500 manufactured by RASCHIG BVBA, and Grilonit F704, V51-31 and G1705 manufactured by EMS-CHEMIE Ltd.

A usable epihalohydrin is one or more selected from epichlorohydrin, epibromohydrin and epiiodidehydrin. Among them, epichlorohydrin is preferably used. A tri- or higher-valent epoxy crosslinker and a divalent epoxy crosslinker can also be mixed and used. Alternatively, an alcohol having three or more hydroxyl groups and an alcohol having two hydroxyl groups can also be mixed and reacted in production of a tri- or higher-valent epoxy crosslinker.

3. Suitable Properties of Epoxy Crosslinker (1) Average Number of Epoxy Groups

Even a tri- or higher-valent epoxy crosslinker may include a divalent epoxy compound as a by-product, as described above, and therefore it is important to figure out the average number of epoxy groups and thus figure out the proportion of a compound having a trivalent epoxy group in evaluation of each product.

The average number of epoxy groups is obtained by identifying each epoxy compound included in the epoxy crosslinker by GPC, determining the number of epoxy groups with respect to each epoxy compound, obtained by multiplication of the number of epoxy groups in one molecule of each epoxy compound with the molar number of the epoxy compound, and dividing the total value by the total molar number of the entire epoxy compound contained in the epoxy crosslinker.

The average number of epoxy groups of an epoxy crosslinker for use in an embodiment of the present invention is more than 2.0, preferably 2.25 or more, more preferably 2.5 or more from the viewpoint of favorable fatigue durability of a glove.

(2) Equivalent

Figure 2:
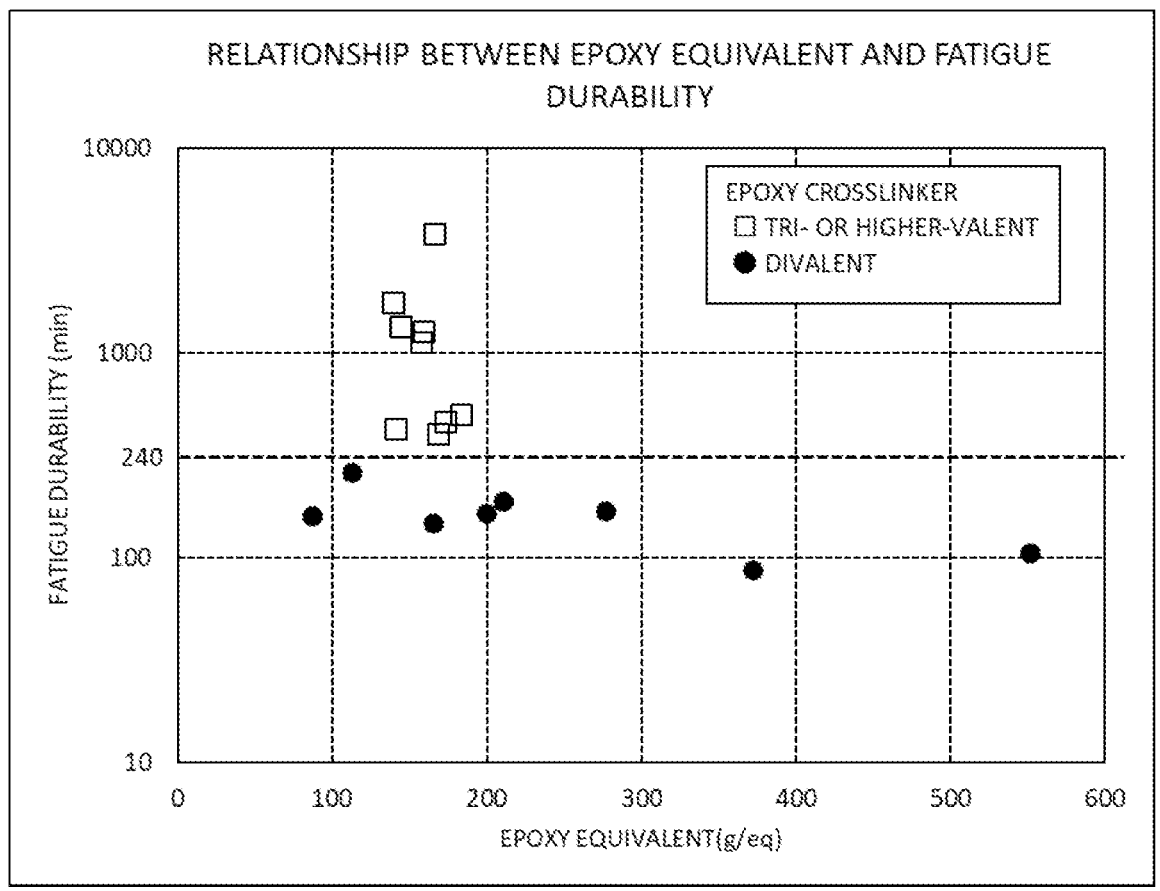
FIG. 2 illustrates a graph representing a relationship between the epoxy equivalent and the fatigue durability of each epoxy crosslinker.

The epoxy equivalent of the epoxy crosslinker is represented in FIG. 2 which illustrates a relationship between the epoxy equivalent and the fatigue durability of the epoxy crosslinker with the valence of the epoxy crosslinker being classified to divalent or tri- or higher-valent. Thus, the epoxy equivalent of the epoxy crosslinker is preferably 100 g/eq. or more and 200 g/eq. or less from the viewpoint of favorable fatigue durability of a glove. It can be seen based on FIG. 2 that a trivalent epoxy crosslinker is more favorable in fatigue durability than a divalent epoxy crosslinker even in the case where the epoxy equivalents of such crosslinkers are the same.

The epoxy equivalent of the epoxy crosslinker corresponds to a value obtained by dividing the average molecular weight of the epoxy crosslinker by the average number of epoxy groups, and exhibits the average weight per epoxy group. Such a value can be measured by a perchloric acid method.

(3) Molecular Weight

The molecular weight of the epoxy compound contained in the epoxy crosslinker is preferably 150 to 1500, more preferably 175 to 1400, more preferably 200 to 1300.

4. Amount of Epoxy Crosslinker Added

The amount of the epoxy crosslinker added can be, for example, 0.2 parts by weight or more based on 100 parts by weight of the elastomer, while depending on the number of epoxy groups in one molecule of the epoxy compound and the purity thereof, from the viewpoint of securement of fatigue durability due to introduction of a sufficient crosslinked structure into the elastomer. In practical use, an amount added of 0.4 to 0.7 parts by weight based on 100 parts by weight of the elastomer can allow for production of even an ultrathin glove (2.7 g of glove having a thickness of about 50 μm) having sufficient performances. On the other hand, an excessive amount added may rather than result in deterioration in characteristics of the elastomer, and thus the upper limit of the amount of the epoxy crosslinker added to the composition for dip molding is considered to be preferably 5 parts by weight based on 100 parts by weight of the elastomer. It is notable that a conventional glove obtained using a divalent epoxy crosslinker, as an example, which is 4.5 g (thickness: 90 μm) of a glove produced in a condition of an amount added of 2 parts by weight based on 100 parts by weight of an elastomer, is just barely at acceptance levels of a fatigue durability at a palm part of 240 minutes or less and a fatigue durability at a finger crotch part of about 90 minutes. On the other hand, 2.7 g (thickness: 50 μm) of an ultrathin glove produced in a condition of a smaller amount added of 0.4 to 0.7 parts by weight based on 100 parts by weight of the elastomer in the present invention can exceed the criteria of fatigue durability.

5. Crosslinking Reaction of Epoxy Compound with Carboxyl Group of XNBR

Epoxy crosslinking occurs according to the following reaction as represented by the following formula (IV). Herein, a monovalent epoxy compound is used for simplifying the description in an epoxy compound represented by the following (IV). R' represents a group constituting the elastomer.

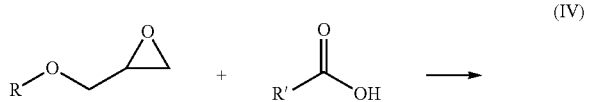
(IV)

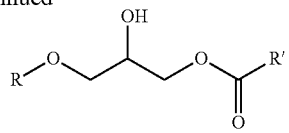

Crosslinking formation with the epoxy compound is made together with a carboxyl group in XNBR, and examples of optimal conditions of crosslinking formation with the epoxy compound include the occurrence of a ring-opening reaction of an epoxy group due to heating at 110° C. or higher in a curing step.

However, the crosslinking temperature can be further decreased by selection of XNBR in the present invention.

6. Weakness of Epoxy Compound

The epoxy compound may be deactivated because OH serves as a catalyst in an alkaline condition of a pH of 9 to 10.5 in the composition for dip molding to cause hydrolysis represented by the following formula (V) to progress in formation of an epoxy-crosslinked glove by dip molding. Such hydrolysis, however, hardly progresses in the inside of a rubber particle of XNBR, such an inside being in a lipophilic environment.

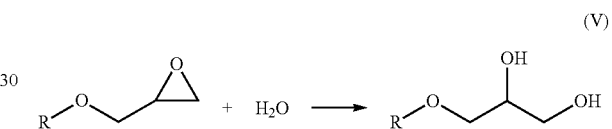
(V)

A common large-scale production process of a glove involves stirring, and dispersing and uniforming a composition for dip molding, in a large tank. Even loading of an epoxy crosslinker at the last stage causes a long time to be taken for exhaustion of such an epoxy crosslinker in a production line, and thus such an epoxy crosslinker is in an aqueous environment for a long time and the epoxy group thereof may be deactivated over time. Thus, a problem which may be caused is that a crosslinkable epoxy compound in such an epoxy crosslinker is decreased before a curing step for formation of epoxy crosslinking.

In addition, hydrolysis of an epoxy compound is accelerated in an alkaline environment, and thus a composition for dip molding, in which the pH is adjusted to 9 or more, is in an environment where deactivation is more easily caused.

The present invention enables even a glove produced after a longer storage period than a conventional case to ensure sufficient performances.

7. Comparison of Conventional Divalent Epoxy Compound with Tri- or Higher-Valent Epoxy Compound While a divalent epoxy compound conventionally used has provided two-point crosslinking which is crosslinking between two carboxyl groups in one molecule, an epoxy compound contained in an epoxy crosslinker for use in an embodiment of the present invention can provide multipoint crosslinking which is crosslinking among three or more carboxyl groups in one molecule. It is considered that a glove increased in crosslinking between elastomer molecules thus has a significantly high fatigue durability as compared with a conventional glove obtained by two-point crosslinking. The upper limit of the number of epoxy groups contained in one molecule of the epoxy compound contained in the epoxy crosslinker is not particularly limited in order to impart more favorable fatigue durability. A divalent epoxy compound conventionally mainly used, when only one epoxy group thereof is deactivated, causes the loss of the crosslinking function of the epoxy compound. On the contrary, an epoxy crosslinker containing a tri- or higher-valent epoxy compound, for use in the present invention, still has a crosslinking function even after one epoxy group thereof is deactivated, because two or more epoxy groups remain. Thus, such a tri- or higher-valent epoxy compound can allow crosslinking to be more efficiently performed as compared with a conventional divalent epoxy compound.

From the reason, a glove having the same performances as in a conventional glove can be produced even by a small amount added, as compared with a conventional case.

<pH Adjuster>

The composition for dip molding is needed to be adjusted so as to be alkaline at the stage of a maturation step described below. One reason why the composition is made alkaline is because —COOH is oriented outward as —COO⁻ from an elastomer particle for sufficient metal crosslinking to thereby allow crosslinking between such particles with zinc and calcium or the like to be sufficiently performed in the case of use of a composition including a metal crosslinker such as zinc oxide and a calcium ion-containing coagulant.

A preferable pH value is 10 to 10.5, and a too low pH causes a decrease in outward orientation of —COOH from a particle to result in insufficient crosslinking and a too high pH causes deterioration in stability of latex.

A pH adjuster usable is any one or more of an ammonium compound, an amine compound and an alkali metal hydroxide. Among them, an alkali metal hydroxide is preferably used because production conditions such as pH adjustment and gelling conditions are simple, and in particular, potassium hydroxide (hereinafter, also designated as "KOH") is most easily used. Hereinafter, Examples will be described with KOH being mainly used as the pH adjuster.

The amount of the pH adjuster added is about 0.1 to 4.0 parts by weight based on 100 parts by weight of the elastomer in the composition for dip molding, and about 1.8 to 2.0 parts by weight of the pH adjuster is usually industrially used.

<Metal Crosslinker>

An elastomer constituting a glove according to an embodiment of the present invention has a crosslinked structure combined with an ionic bond of calcium in the case of use of a calcium ion-containing coagulant.

Calcium is rapidly easily eluted in an artificial sweat liquid simulating human sweat, easily resulting in a reduction in tensile strength. Moreover, the radius of a calcium ion is larger than that of any ion of zinc oxide or an aluminum complex serving as other metal crosslinker, and is insufficient in impermeability of an organic solvent. It is thus considered that partial replacement of calcium crosslinking with zinc crosslinking or aluminum crosslinking is effective. Moreover, the amount of zinc oxide or an aluminum complex can be increased to result in control of tensile strength and drug resistance.

A polyvalent metal compound for use as the metal crosslinker is for ionic crosslinking between functional groups such as an unreacted carboxyl group in the elastomer. The polyvalent metal compound usually used is zinc oxide being a divalent metal oxide. Aluminum as a trivalent metal can also be formed into a complex and thus used for a crosslinker. Aluminum is difficult to handle because it is contained in a so large amount that a glove is so hard, while it has the smallest ion radius among the above and is thus optimal for exhibiting drug resistance and tensile strength.

The amount of the divalent metal oxide, for example, zinc oxide and/or an aluminum complex, added is 0.2 to 4.0 parts by weight, preferably 0.4 to 3.0 parts by weight based on 100 parts by weight of the elastomer in the composition for dip molding. The upper limit can also be, for example, 1.5 parts by weight.

The aluminum complex usable is, for example, polybasic aluminum hydroxycarboxylate. The polybasic aluminum hydroxycarboxylate usable is, for example, a solution of 10% citric acid or tartaric acid in water.

$[(AlCit)_3(OH)_4]^{7-}$ obtained using a water-soluble aluminum citrate complex $[(AlCit)_3(OH)(H_2O)]^{4-}$ has four hydroxyl groups, and serves as a crosslinker of a carboxyl group ("Synthesis, and application to rubber latex" by Noboru, EBIHARA et al., Reports of Chiba Industrial Technology Research Institute, No. 8, pages 22 to 27 (October, 2010)).

<Other Component(s)>

The composition for dip molding includes at least the above essential components and water, and usually include any other component(s), in addition thereto.

Herein, an aspect can be exemplified where the composition for dip molding is prepared so that the crosslinked structure of a glove to be obtained is constituted from only a crosslinked structure formed by the epoxy crosslinker and a calcium ion derived from the coagulant.

The composition for dip molding may further include a dispersant. The dispersant is preferably an anionic surfactant, examples include carboxylate, sulfonate, phosphate, polyphosphate, polymerized alkyl aryl sulfonate, polymerized sulfonated naphthalene, and a polymerized naphthalene/formaldehyde condensation polymer, and sulfonate is preferably used.

A commercially available product can be used for the dispersant. For example, "Tamol NN9104" manufactured by BASF can be used. The amount thereof used is preferably about 0.5 to 2.0 parts by weight based on 100 parts by weight of the elastomer in the composition for dip molding.

The composition for dip molding can further include various other additives. Examples of such additives include an antioxidant, a pigment and a chelating agent. A usable antioxidant is a hindered phenol type antioxidant, for example, Wingstay L. A usable pigment is, for example, titanium dioxide. A usable chelating agent is, for example, sodium ethylenediamine tetraacetate.

The composition for dip molding of the present embodiment can be produced by mixing the elastomer, the epoxy crosslinker, the pH adjuster and water, and, if necessary, each additive such as a humectant, a dispersant, and an antioxidant by a traditional mixing unit such as a mixer.

2. Method for Producing Glove

A glove of the present embodiment can be more preferably produced by the following production method.

That is, such a production method is a method for producing a glove, including (1) a coagulant attachment step (a step of attaching a coagulant to a glove mold), (2) a maturation step (a step of adjusting and stirring the composition for dip molding), (3) a dipping step (a step of dipping the glove mold in the composition for dip molding), (4) a gelling step (a step of gelling the film formed on the glove mold to produce a cured-film precursor), (5) a leaching step (a step of removing impurities from the cured-film precursor formed on the glove mold), (6) a beading step (a step of producing a wind on a glove cuff portion), (7) a pre-curing step, (a step of heating and drying the cured-film precursor at a temperature lower than that in a curing step), provided that the present step is an optional step; and (8) a curing step (a step of heating and drying at a temperature necessary for a crosslinking reaction), wherein steps (3) to (8) above are performed in the recited order.

Also encompassed is a method for producing a glove, according to so-called double dipping, wherein steps (3) and (4) above in the above production method are repeated twice.

Herein, the cured-film precursor means a film constituted from the elastomer aggregated on the glove mold by the coagulant in the dipping step, and refers to a film which is gelated to some extent by dispersion of calcium in the film in the subsequent gelling step and which is a film not finally cured yet.

Hereinafter, the detail will be described with respect to every step.

(1) Coagulant Attachment Step (a) A mold or former (glove mold) is dipped a coagulant solution containing 5 to 40% by weight, preferably 8 to 35% by weight of a $Ca^{2+}$ ion serving as a coagulant or a gelling agent. The time taken for attachment of the coagulant or the like onto the surface of the mold or former is appropriately defined, and is usually, about 10 to 20 seconds. The coagulant to be used is nitrate or chloride of calcium. Any other inorganic salt having the effect of precipitating the elastomer may also be used elastomer. In particular, calcium nitrate is preferably used. The coagulant is usually used as an aqueous solution containing 5 to 40% by weight of the coagulant.

Such a coagulant-containing solution preferably includes about 0.5 to 2% by weight, for example, about 1% by weight of, for example, potassium stearate, calcium stearate, mineral oil or ester-based oil, as a release agent.

(b) The mold or former to which the coagulant solution is attached is placed in an oven having an internal temperature of a furnace, of about 110° C. to 140° C., for 1 to 3 minutes, and dried to thereby attach the coagulant onto a part or the entire of the surface of the glove mold. It is here to be noted that the surface temperature of a hand mold after drying is about 60° C. and has any effect on the subsequent reaction.

(c) Calcium contributes to not only a coagulant function for formation of a film on the surface of the glove mold, but also a crosslinking function of a corresponding portion of a glove finally completed. The metal crosslinker to be added later can also be said to be for strengthening the weakness about the crosslinking function of calcium.

(2) Maturation Step (a) The step is to adjust the pH of a composition for dip molding according to an embodiment of the present invention to 9.0 or more, and disperse and uniform the composition with stirring, as described in the section of "pH Adjuster" of the composition for dip molding.

(b) The present step is usually performed in a large-scale tank in an actual process for producing a glove, and thus about 24 hours may be taken for the maturation. The composition is allowed to flow into a dipping tank and dipped therein, and the dipping tank is refilled with the composition depending on a reduction in the liquid level. Thus, the epoxy crosslinker is preferably needed not to be deactivated for about 4 days, at least about 2 days. A conventional divalent epoxy crosslinker has been able to be maintained for only at most about 1 day (has been deactivated after more than 1 day), but a trivalent epoxy crosslinker can be used to thereby allow no deactivation for a minimum limit of 2 days as a mass production condition to be achieved.

The dipping tank may also be tailored because the pH tends to be lower according to the usage time.

(3) Dipping Step (a) The step is to allow the composition for dip molding according to an embodiment of the present invention (dipping liquid), stirred and uniformed in the maturation step, to flow into the dipping tank, to thereby dip the mold or former where the coagulant is attached and dried in the coagulant attachment step, in the dipping tank usually in conditions of a period of 1 to 60 seconds and a temperature of 25 to 35° C.

The step is to allow the elastomer included in the composition for dip molding to be aggregated on the surface of the mold or former by a calcium ion contained in the coagulant, to form a film.

(4) Gelling Step (a) A conventional sulfur-crosslinked glove has been obtained by traditionally heating to nearly 100° C. in a gelling oven. Such heating has been for allowing crosslinking of latex to slightly progress for gelling to some extent so that no film is deformed in subsequent leaching. Such heating has been again for dispersing calcium in a film and then performing sufficient calcium crosslinking.

On the contrary, gelling conditions in the case of use of the epoxy crosslinker as in the present invention may usually include lifting from the dipping tank and standing in the temperature range from 21° C. as the lower limit of room temperature (23° C.±2° C.) to nearly 120° C. for 20 seconds or more.

Such conditions correspond to conditions in the case of use of KOH as the pH adjuster, and different conditions therefrom may be adopted in the case of use of an ammonium compound or an amine compound as the pH adjuster.

(b) Gelling conditions in the case of use of the epoxy crosslinker in general mass production are defined based on the facts that the mold or former has reached a certain temperature and that the ambient temperature of a plant is often about 50° C. Furthermore, the upper limit of the temperature in the gelling step is expected also in consideration of the case of intentional heating for an increase in quality. An embodiment of the present invention where the epoxy crosslinker is used and KOH is used as the pH adjuster can sufficiently respond to such a high temperature condition.

The time for the gelling step can be, for example, usually 30 seconds to 5 minutes, and can be, for example, about 1 to 3 minutes in another aspect.

(5) Leaching Step (a) The leaching step is to remove excess chemical agent and impurities as obstacles to the subsequent curing, for example, calcium precipitated on the surface of the cured-film precursor, by washing with water. In general, the former is immersed in warm water at 30 to 70° C. for about 1 to 5 minutes.

(b) In the case of the composition for dip molding including zinc oxide and/or an aluminum complex as the metal crosslinker, another function of the leaching step is to wash the cured-film precursor, adjusted to be alkaline, with water, thereby allowing the precursor to be near-neutral, and to replace zinc oxide or an aluminum complex ion contained in the cured-film precursor with $Zn^{2+}$ and/or $Al^{3+}$, thereby enabling metal crosslinking in the subsequent curing step to be made.

(6) Beading Step (a) The step is to wind a cuff end of a glove as the cured-film precursor, after completion of the leaching step, to produce a ring having a proper thickness, for reinforcing. Such a step is performed in a wet state after the leaching step, thereby allowing a rolled portion to be favorable in adhesiveness.

(7) Pre-Curing Step (a) The step is to heat and dry the cured-film precursor after the beading step, at a temperature lower than that in the curing step. In general, the heating and drying in this step are performed at 60 to 90° C. for about 30 seconds to 5 minutes. A curing step at a high temperature without undergoing any pre-curing step may cause moisture to be rapidly evaporated, to generate a projection like a blister on a glove, resulting in the loss in quality, but the method may be advanced to a curing step without undergoing the present step.

(b) The temperature may be raised to the final temperature in a curing step without undergoing the present step, and in the case where curing is performed in a plurality of drying furnaces and the temperature of the drying furnace at the first stage is slightly low, such drying at the first stage corresponds to the pre-curing step.

(8) Curing Step (a) The curing step is a step of finally completing crosslinking by heating and drying at a high temperature, to provide a cured film as a glove. Since a glove with an epoxy crosslinker is sufficient in crosslinking only at a high temperature, heating and drying are usually made at 100 to 150° C. for 10 to 30 minutes, preferably for about 15 to 30 minutes. It is noted that XNBR high in water releasability can be used in an embodiment of the present invention and thus sufficient crosslinking is made even at a temperature decreased to 90° C., furthermore, about 70° C. Accordingly, the temperature in the curing step can be, for example, 70 to 150° C. A preferable temperature in the curing step can be, for example, 100 to 140° C.

(b) Crosslinking of a glove is completed in the curing step, and the glove is formed from calcium crosslinking and epoxy crosslinking with a carboxyl group of XNBR, as well as zinc and/or aluminum crosslinking in the case of addition of zinc oxide and/or an aluminum complex as the metal crosslinker. In the case of use of KOH as the pH adjuster, a carboxyl group bound to such potassium is also crosslinked with a carbonyl group derived from a carboxyl group generated by ring-opening of an epoxy group in the curing step.

(9) Double Dipping

The method for producing a glove is described above with reference to so-called single dipping. On the contrary, the dipping step and the gelling step may be each performed twice or more, and such a process is usually referred to as "double dipping".

Such double dipping is performed for the purpose of preventing pinholes from being generated in production of a thick glove (thickness: about 200 to 300 μm) and also in a method for producing a thin glove.

Examples of notes of caution for such double dipping include a sufficient time taken for a gelling step so that calcium is sufficiently precipitated up to the surface of a film in the first gelling step in order to aggregate XNBR in the second dipping step.

According to studies by the present inventors, it has been found that a glove can be produced with a composition for dip molding, where a trivalent epoxy crosslinker is used, according to the above production conditions, resulting in mass production of a glove having a high fatigue durability and a tensile strength of 6 N or more even in the case of production of an ultrathin glove (thickness: 50 to 60 μm) with a small amount of 0.4 to 0.7 parts by weight of the epoxy crosslinker based on 100 parts by weight of the elastomer.

3. Glove (1) Structure of Glove of Present Embodiment

A glove according to a first embodiment is a glove including a cured film of an elastomer containing a (meth) acrylonitrile-derived structural unit, an unsaturated carboxylic acid-derived structural unit and a butadiene-derived structural unit in a polymer main chain, wherein the elastomer has a crosslinked structure of a carboxyl group in an unsaturated carboxylic acid-derived structural unit with an epoxy crosslinker including an epoxy compound having three or more epoxy groups in one molecule. The present glove may additionally have a crosslinked structure of such a carboxyl group with calcium derived from a coagulant.

The glove can be preferably produced with the composition for dip molding of the present embodiment. The elastomer preferably contains 20 to 40% by weight of a (meth) acrylonitrile-derived structural unit, 1 to 10% by weight of an unsaturated carboxylic acid-derived structural unit and 50 to 75% by weight of a butadiene-derived structural unit.

A glove according to a second embodiment has a crosslinked structure of a carboxyl group of an elastomer with zinc and/or aluminum, in addition to the crosslinked structure in the first embodiment.

The glove according to the first embodiment is effective particularly as a thick (thickness: 200 to 300 μm) glove. The reason for this is because a thicker film allows tensile strength, fatigue durability, and the like to be exhibited. The glove according to the present embodiment can be kept in strength due to calcium crosslinking with a proper elastomer, and on the other hand, can be kept in high fatigue durability with a tri- or higher-valent epoxy crosslinker.

The glove according to the second embodiment is made by compensating the weakness of calcium crosslinking with zinc and/or aluminum crosslinking. A drawback of calcium crosslinking, where strength as the initial performance can be kept, but deterioration in strength is easily caused due to elution of calcium in salt water, resulting in easy penetration of chemical agents, can be compensated with zinc and/or aluminum crosslinking.

The glove according to the second embodiment is particularly preferable as an ultrathin or thin glove (thickness: 50 to 90 μm).

As described above, the glove according to the second embodiment can be changed in the priority among epoxy crosslinking, calcium crosslinking, and zinc and/or aluminum crosslinking, resulting in the change in performance of the glove.

(2) Features of Glove According to Embodiment of Present Invention (a) A glove according to an embodiment of the present invention includes substantially neither sulfur nor a vulcanization accelerator as in other vulcanization accelerator-free glove, unlike a conventional XNBR glove, and thus causes no IV-type allergy. It is noted that a trace amount of sulfur may be detected because sulfur is contained in a surfactant or the like during production of an elastomer.

(b) In general, physical properties of a glove are usually evaluated with respect to tensile strength, elongation, and fatigue durability. The acceptance criteria of a glove are usually as follows: the acceptance criteria according to the standard in Europe (EN standard) include a force at break of 6 N or more; and the tensile strength according to the test in our Company is defined to be 20 MPa which corresponds to the lower limit in an actual product currently marketed.

The acceptance criteria of a glove with respect to the elongation thereof are as follows: the elongation at break in a tensile test described below falls within the range from 500 to 750%, the modulus at 100% (tensile stress at an elongation of 100%) falls within the range from 3 to 10 MPa, and the fatigue durability at a finger crotch part is 90 minutes or more (that at a palm corresponds to 240 minutes or more).

A glove according to an embodiment of the present invention satisfies the acceptance criteria even in mass production. Furthermore, the epoxy-crosslinked glove is high in fatigue durability, and is much high in fatigue durability as compared with a glove obtained by use of a divalent epoxy crosslinker.

Thus, the present glove can satisfy the above criteria by a smaller amount of 0.4 to 0.7 parts by weight of the epoxy crosslinker based on 100 parts by weight of the elastomer, than the amount of a divalent epoxy crosslinker.

Furthermore, the weight of a conventional thin glove has been 3.5 to 4.5 g (thickness: 70 to 90 μm), and on the contrary, the glove according to the present embodiment can satisfy the acceptance criteria for the first time as a vulcanization accelerator-free glove, and an ultrathin glove having a weight of 3.2 g (thickness: 60 μm) and also an ultrathin glove having a weight of 2.7 g (thickness: 50 μm) can be mass-produced. The lower limit of the thickness of an ultrathin glove that can be produced is 40 μm.

(c) The composition for dip molding, for use in production of the glove according to the second embodiment of the present invention further includes a metal crosslinker such as zinc and/or an aluminum complex added thereto, thereby allowing deterioration in strength due to human sweat in wearing to be prevented, to provide a glove increased in chemical impermeability.

(d) The biggest weakness of an epoxy crosslinker has been deactivation of an epoxy group in an epoxy compound in a composition for dip molding prepared in an alkaline condition. Thus, it has been difficult to produce a glove with performances being kept in the case of bulk preparation in a maturation tank at one time in mass production and use of a prepared product over several times. Therefore, it has been necessary to perform a maturation step and a dipping step in a time as short as possible. It has also been necessary to completely use promptly a composition for dip molding in the case of production of a glove with a divalent epoxy crosslinker. There has also been observed the variation between lots in the case of use of a divalent epoxy crosslinker.

A glove according to an embodiment of the present invention, produced using an epoxy crosslinker containing an epoxy compound having three or more epoxy groups in one molecule, can be used for a longer time in a dipping step due to preparation of a larger amount of a composition for dip molding at one time, than one produced using a conventional divalent epoxy crosslinker. Thus, a glove meeting the above acceptance criteria can be produced in conditions more fitting to mass production.

EXAMPLES

Hereinafter, the present invention will be described in more detail based on Examples, but the present invention is not intended to be limited to such Examples. Unless particularly noted, "%" means "% by weight" and "part(s)" means "part(s) by weight". In the following description, "part(s) by weight" indicates part(s) by weight based on 100 parts by weight of the elastomer in principle.

<Production of Cured Film>

1. Production of Composition for Dip Molding (Latex)

A 1-L beaker (manufactured by AS ONE Corporation, 105 mm in diameter×150 mm in height) was charged with 230 g of an elastomer (XNBR) solution (solid content: 45%) represented in Table 1, 100 g of water was added for dilution, and stirring was initiated. After the pH was preliminarily adjusted to 10.0 with an aqueous 5% by weight potassium hydroxide solution, each crosslinker represented in Table 2 was added.

Furthermore, 0.4 g (solid content: 53%) of an antioxidant (trade name "CVOX-50" manufactured by Farben Technique (M) Sdn Bhd), 1.5 g of zinc oxide (trade name "CZnO-50" manufactured by Farben Technique (M) Sdn Bhd) and 1.5 g (solid content: 71%) of titanium oxide (trade name "PW-601" manufactured by Farben Technique (M) Sdn Bhd) were added, water was further added so that the concentration of the solid content was 22%, and the resultant was stirred and mixed overnight. The amount of the resulting composition for dip molding was 503 g. Here, the composition for dip molding was continuously stirred in the beaker until use.

Such an experiment was performed with the amount of zinc oxide added being appropriately changed.

2. Preparation of Congealed Liquid

After 19.6 g of "S-9" (trade name, concentration of solid content: 25.46%) manufactured by Crestage Industry Sdn Bhd, as a release agent, was diluted about 2-fold with a part of 30 g of water previously metered, and was slowly added to a solution where 0.56 g of a surfactant "Teric 320" (trade name) manufactured by Huntsman Corporation was dissolved in 42.0 g of water. The total amount of the remaining S-9 in a container was added thereto with washing with water, and the resultant was stirred for 3 to 4 hours. A 1-L beaker (manufactured by AS ONE Corporation, 105 mm in diameter×150 mm in height) accommodating 143.9 g of calcium nitrate tetrahydrate dissolved in 153.0 g of water was separately prepared. The S-9 dispersion liquid previously prepared was added to a calcium nitrate solution with stirring. The pH was adjusted to 8.5 to 9.5 with 5% ammonia water, and water was added so that the rate of calcium nitrate was finally 20% in terms of anhydride and the concentration of the solid content of S-9 was 1.2%, thereby providing 500 g of a congealed liquid. The resulting congealed liquid was continuously stirred in the 1-L beaker until use.

3. Production of Cured Film

The resulting congealed liquid was warmed to about 50° C. with stirring and filtered by a 200-mesh nylon filter, and then placed in a dipping container, and thereafter ceramic plate (200×80×3 mm, hereinafter, designated as "porcelain panel".) washed and then warmed to 70° C. was dipped therein. Specifically, the porcelain panel was dipped to a position of 18 cm from the tip thereof over 4 seconds after the tip of the porcelain panel was brought into contact with the surface of the congealed liquid, retained for 4 seconds with being dipped, and extracted over 3 seconds. The congealed liquid attached onto the surface of the porcelain panel was rapidly shaken out, and the surface of the porcelain panel was dried. The porcelain panel after drying was again warmed to 70° C. in preparation for dipping in the composition for dip molding (latex).

The composition for dip molding (latex) was filtered by a 200-mesh nylon filter at room temperature, and thereafter placed in a dipping container, and the porcelain panel at 70° C., to which the congealed liquid was attached, was dipped therein. Specifically, the porcelain panel was dipped over 6 seconds, retained for 4 seconds, and extracted over 3 seconds. The porcelain panel was retained in the air until no latex was sagged, and latex droplets attached to the tip was lightly shaken out.

The porcelain panel dipped in the latex was dried at 23° C.±2° C. for 30 seconds (gelling step), and leached in warm water at 50° C. for 5 minutes. Thereafter, the resultant was dried at 70° C. for 5 minutes, and subjected to thermal curing at 130° C. for 30 minutes. Herein, such an experiment was performed with gelling and curing conditions being appropriately changed.

The resulting cured film (thickness: 0.08 mm on average) was clearly peeled off from the porcelain panel, and stirred in an environment of 23° C.±2° C. and a humidity of 50%±10% until the film was subjected to tests of physical properties. Herein, such an experiment was performed with the thickness of the cured film being appropriately changed.

Specific experiment conditions are clearly described in each Table.

The present experiment also included an experiment where a glove was actually produced by use of a robot.

XNBR used in the present experiment is represented below.

TABLE 1

| XNBR | | Amount of residue (% by weight) | | Mooney viscosity (ML$_{(1+4)}$ 100° C.) | MEK-insoluble fraction (% by weight) |
|---|---|---|---|---|---|
| Product name | Manufacturer | AN | MMA | | |
| (a) NL120H | LG Chem | 28 | 4.7 | 105 | 5.7 |
| (b) NL128 | LG Chem | 31 | 5.2 | 102 | 5.4 |
| (c) NL117 | LG Chem | 36 | 5.1 | 114 | 42.0 |
| (d) BST8503 | BST | 27 | 2.9 | 129 | 23.5 |
| (e) Synthomer 6348 | Synthomer | 33 | 2.9 | 146 | 17.5 |

Each numerical value in the Table represents an analytical value.

Properties of XNBR used in the Experimental Example were measured as follows.

<Amount of Acrylonitrile (AN) Residue and Amount of Unsaturated Carboxylic Acid (MMA) Residue>

Each elastomer was dried to prepare a film. The film was subjected to FT-IR measurement for determination of each absorbance (Abs) at an absorption wavenumber of 2237 cm$^{-1}$ derived from an acrylonitrile group and at an absorption wavelength of 1699 cm$^{-1}$ derived from an unsaturated carboxylic acid group, and thus determination of the amount of an acrylonitrile (AN) residue and the amount of an unsaturated carboxylic acid (MMA) residue.

The amount of an acrylonitrile residue (%) was determined from a calibration curve created in advance. The calibration curve was created from a sample having a known amount of an acrylonitrile group, where polyacrylic acid was added as an internal standard substance to each elastomer.

The amount of an unsaturated carboxylic acid residue was determined from the following expression.

Amount of unsaturated carboxylic acid residue (% by weight)=[Abs(1699 cm$^{-1}$)/Abs (2237 cm$^{-1}$)]/ 0.2661

In the expression, a coefficient of 0.2661 was a corresponding value determined from a calibration curve created from a plurality of samples having a known ratio of the amount of an unsaturated carboxylic acid group and the amount of an acrylonitrile group.

<Mooney Viscosity (ML$_{(1+4)}$ 100° C.)>

While 200 ml of an aqueous saturated solution of a 4:1 mixture of calcium nitrate and calcium carbonate was stirred at room temperature, each elastomer latex was dropped by a pipette to precipitate solid rubber. The resulting solid rubber was taken out and washed with about 1 L of ion exchange water ten times under stirring, and thereafter the solid rubber was squeezed for dehydration and dried in vacuum (60° C., 72 hours), thereby preparing a measurement rubber sample. The resulting measurement rubber was allowed to pass through a 6-inch roll at a roll temperature of 50° C. and a roll gap of about 0.5 mm several times until the rubber was collected, and the resultant was subjected to measurement at 100° C. with a rotating body having a large diameter, according to JIS K6300-1:2001 "Unvulcanized rubber-Physical properties, Part 1: Determination of viscosity and scorch time according to Mooney viscometer".

<MEK-Insoluble Fraction>

The MEK (methyl ethyl ketone)-insoluble (gel) component was subjected to the following measurement. A mesh basket (80 mesh) weighed was charged with 0.2 g of an XNBR latex dry sample, the sample was dipped together with the basket in 80 mL of a MEK solvent in a 100-mL beaker, and the basket was lidded by a paraffin film and left to still stand in a fume hood for 24 hours. Thereafter, the mesh basket was taken out from the beaker, and hung in the fume hood and thus dried for 1 hour. The resultant was dried under reduced pressure at 105° C. for 1 hour and then weighed, and the weight of the basket was subtracted to thereby determine the weight of an XNBR latex dry product after dipping.

The content of MEK-insoluble component (insoluble fraction) was calculated from the following expression.

Content of insoluble component (% by weight)= (Weight(g) after dipping/Weight(g) before dipping)×100

Herein, the XNBR latex dry sample was prepared as follows. In other words, the XNBR latex dry sample was obtained by stirring XNBR latex in a 500-mL bottle at a number of rotations of 500 rpm for 30 minutes, weighing 14 g of the latex and placing it in a stainless tray of a size of 180×115 mm, drying it at 23° C.±2° C. and a humidity of 50±10% RH for 5 days to provide a cast film, and cutting the film into a 5 mm square.

Each epoxy crosslinker used in Experimental Examples is as follows.

TABLE 2

| | Epoxy crosslinker | | Valence of raw material alcohol | Epoxy equivalent (g/eq.) | Average number of epoxy groups | Polyvalent alcohol constituting mother skeleton |
|---|---|---|---|---|---|---|
| | Product name | Manufacturer | | | | |
| A | Denacol Ex-313 | Nagase | 3 | 141 | 2.3 | Glycerol triglycidyl |
| B | Denacol Ex-314 | Nagase | 3 | 144 | 2.3 | Glycerol triglycidyl |
| C | Denacol Ex-321 | Nagase | 3 | 140 | 2.7 | Trimethylolpropane triglycidyl |
| D | Denacol Ex-421 | Nagase | 4 | 159 | 3.0 | Diglycerol triglycidyl |
| E | Denacol Ex-612 | Nagase | 4 | 166 | 4.0 | Sorbitol polyglycidyl |
| F | Denacol Ex-614 | Nagase | 4 | 167 | 3.6 | Sorbitol polyglycidyl |
| G | Denacol Ex-614B | Nagase | 4 | 173 | — | Sorbitol polyglycidyl |
| H | Denacol Ex-512 | Nagase | 5 | 168 | 4.1 | Polyglycerol polyglycidyl |
| I | Denacol Ex-521 | Nagase | 5 | 183 | 6.3 | Polyglycerol polyglycidyl |
| J | Denacol Ex810 | Nagase | 2 | 113 | 2.0 | Ethylene glycol diglycidyl |
| K | Denacol Ex841 | Nagase | 2 | 372 | 2.0 | Polyethylene glycol diglycidyl |
| L | Denacol Ex861 | Nagase | 2 | 551 | 2.0 | Polyethylene glycol diglycidyl |
| M | Denacol Ex-911 | Nagase | 2 | 165 | 2.0 | Propylene glycol diglycidyl |
| N | E0342 | Tokyo Chemical Industry | 2 | 87 | — | Ethylene glycol diglycidyl |
| O | Epolite 200E | KYOEISHA CHEMICAL | 2 | 200 | — | Polyethylene glycol diglycidyl |
| P | Epolite 400E | KYOEISHA CHEMICAL | 2 | 277 | — | Polyethylene glycol diglycidyl |
| Q | BPF307 | NIPPON SHOKUBAI | 2 | 210 | — | Bisphenol F diglycidyl |

Herein, each equivalent is based on a value described in the catalog of each Company, and each average number of epoxy groups represents an analytical value.

The manufacturer name "Nagase" refers to "Nagase ChemteX Corporation".

<Evaluation of Cured Film>

(1) Tensile Strength

A No. 5 dumbbell test piece according to JIS K6251 was cut from a cured film, and the tensile strength (MPa) was measured with a TENSILON universal tensile testing machine RTC-1310A manufactured by A&D Co., Ltd., at a test speed of 500 mm/min., a distance between chucks of 75 mm and a distance between marked lines of 25 mm.

The tensile elongation rate was determined based on the following expression.

Tensile elongation rate (%)=100×(Distance between marked lines at break in tensile test−Distance between marked lines)/Distance between marked lines (2) Fatigue Durability A No. 1 dumbbell test piece according to JIS K6251 was cut from a cured film, and dipped in an artificial sweat liquid (containing 20 g of sodium chloride, 17.5 g of ammonium chloride, 17.05 g of lactic acid and 5.01 g of acetic acid per liter, adjusted to a pH of 4.7 by an aqueous sodium hydroxide solution), thereby evaluating the fatigue durability with an durability test apparatus in FIG. 1.

In other words, a dumbbell test piece having a length of 120 mm was sandwiched by a fixed chuck and a movable chuck at respective positions of 15 mm from of two ends, and a portion of the test piece, located to a distance of 60 mm from the lower portion close to the fixed chuck, was dipped in the artificial sweat liquid. The movable chuck was moved to a minimum position (relaxed state) of 147 mm (123%) and retained for 11 seconds, and thereafter moved to a maximum position (elongated state) at which the length of the test piece reached 195 mm (163%) and again moved to the minimum position (relaxed state) over 1.8 seconds. Such movements were defined as one cycle and a cycle test was performed. The time for one cycle was 12.8 seconds, and was multiplied with the number of cycles until the test piece was broken, thereby providing the time as the fatigue durability (min.).

Hereinafter, the details and results of each Experimental Example are represented in each Table.

TABLE 3

| Experimental Example | Epoxy crosslinker | | | Amount of ZnO added part by weight | Tensile strength (MPa) n = 6 Ave. | Elongation at break (%) n = 6 Ave. | Fatigue durability (min.) n = 3 Ave. |
|---|---|---|---|---|---|---|---|
| | Epoxy used | Amount added parts by weight | Valence of raw material alcohol | | | | |
| Control | — | — | — | — | 41.3 | 503 | 20 |
| 1 | A | 0.5 | 3 | 1 | 43.0 | 570 | 402 |
| 2 | B | 0.5 | 3 | 1 | 46.6 | 580 | 1342 |
| 3 | C | 0.5 | 3 | 1 | 43.3 | 563 | 1420 |
| 4 | D | 0.5 | 4 | 1 | 46.3 | 559 | 1273 |
| 5 | E | 0.5 | 4 | 1 | 37.1 | 545 | 1006 |
| 6 | F | 0.5 | 4 | 1 | 41.6 | 551 | 1033 |

TABLE 3-continued

| Experimental Example | Epoxy crosslinker | | | Amount of ZnO added part by weight | Tensile strength (MPa) n = 6 Ave. | Elongation at break (%) n = 6 Ave. | Fatigue durability (min.) n = 3 Ave. |
|---|---|---|---|---|---|---|---|
| | Epoxy used | Amount added parts by weight | Valence of raw material alcohol | | | | |
| 7 | G | 0.5 | 5 | 1 | 39.6 | 559 | 402 |
| 8 | H | 0.5 | 4 | 1 | 38.0 | 516 | 529 |
| 9 | I | 0.5 | 5 | 1 | 43.1 | 566 | 499 |
| 10 | J | 0.5 | 2 | 1 | 46.9 | 575 | 260 |
| 11 | K | 0.5 | 2 | 1 | 45.0 | 571 | 87 |
| 12 | L | 0.5 | 2 | 1 | 47.3 | 595 | 106 |
| 13 | M | 0.5 | 2 | 1 | 44.6 | 573 | 148 |
| 14 | N | 0.5 | 2 | 1 | 43.6 | 586 | 161 |
| 15 | 0 | 0.5 | 2 | 1 | 46.6 | 615 | 165 |
| 16 | P | 0.5 | 2 | 1 | 45.6 | 590 | 169 |
| 17 | Q | 0.5 | 2 | 1 | 43.0 | 558 | 190 |

Table 3 represents respective average values with respect to the tensile strength, the elongation at break, and the fatigue durability of a film having a thickness of 80 μm, as a usual thin film, prepared with a commercially available divalent, or tri- or higher-valent epoxy crosslinker.

A composition for dip molding was used where (a) was used as XNBR and 0.5 parts by weight of each epoxy crosslinker and 1.0 part by weight of zinc oxide were added. Such a formulation includes a standard amount of each crosslinker suitable for mass production, discussed by the present inventor.

The production conditions in the present experiment were as follows: the composition for dip molding, after a lapse of 17 to 24 hours after the maturation step, was used to produce a film. (Such a time corresponds to the minimum pot life (storage time) in mass production.)

The dipping step was performed for 13 seconds, the gelling step was performed at 23° C.±2° C. for 30 seconds, the leaching step was performed at 50° C. for 5 minutes, the pre-curing step was performed at 70° C. for 5 minutes, and the temperature of the furnace set in the curing step was 130° C. and the step was performed for 30 minutes. The gelling step was performed in conditions of 80° C. and 2 minutes, and the leaching step was performed in conditions of 50° C. and 2 minutes in each of Experimental Examples 10 and 15 to 17.

It was found from the results in Experimental Examples 1 to 9 that an epoxy crosslinker including a compound having three or more epoxy groups in one molecule could be used to thereby provide a glove having not only a tensile strength of 37 MPa or more and an elongation at break of 500% or more, but also a fatigue durability of 400 minutes or more. A glove was also obtained which had a high fatigue durability of more than 1000 minutes. Such performances much exceeded those of a conventional sulfur-crosslinked XNBR glove and a self-crosslinking type vulcanization accelerator-free glove. On the contrary, all gloves produced with a divalent epoxy crosslinker had a fatigue durability of 200 minutes or less except for one glove example having a fatigue durability of more than 240 minutes, although were favorable in tensile strength and elongation at break, as represented in Experimental Examples 10 to 17.

It is found from the results that one using an epoxy crosslinker including a compound having three or more epoxy groups in one molecule is clearly enhanced in fatigue durability as compared with one using an epoxy crosslinker including no compound having three or more epoxy groups in one molecule.

Such a finding indicates that deactivation of an epoxy crosslinker occurs even in the case of a lapse of the minimum time of 17 to 24 hours after preparation of a composition for dip molding, in terms of a mass production condition, and the degree thereof is lower in a tri- or higher-valent epoxy crosslinker than a divalent epoxy crosslinker.

TABLE 4

| Experimental Example | Epoxy crosslinker Amount added parts by weight | ZnO Amount added (part by weight) | Tensile strength (MPa) | Elongation at break (%) | Fatigue durability (min) n = 3 Ave. |
|---|---|---|---|---|---|
| Control | 0 | 1 | 48.2 | 570 | 57 |
| 18 | 0.01 | 1 | 46.4 | 565 | 80 |
| 19 | 0.05 | 1 | 47.8 | 567 | 67 |
| 20 | 0.1 | 1 | 47.0 | 565 | 107 |
| 21 | 0.2 | 1 | 45.4 | 565 | 1009 |
| 2 | 0.5 | 1 | 46.6 | 580 | 1342 |
| 22 | 1.0 | 1 | 43.5 | 500 | 1645 |
| 23 | 2.0 | 1 | 36.9 | 439 | 1746 |

Experimental Examples represented in Table 4 were studied with respect to how small amount of an epoxy crosslinker added a film having required performances could be obtained, while the amount added in Table 3 was fixed to 0.5 parts by weight. The crosslinker used was epoxy crosslinker B, and the amount thereof added varied from 0.01 to 2.0 parts by weight. XNBR used was (a) and a film having a thickness of 80 μm was prepared. The tensile strength, the elongation at break, and the fatigue durability were measured. The film production conditions were the same as the conditions in Table 3.

It was consequently found that t use of epoxy crosslinker B provided a rapid increase in fatigue durability in an amount added of 0.2 parts by weight, resulting in sufficient formation of epoxy crosslinking. The amount added is more preferably 0.4 to 0.7 parts by weight in terms of practical use and mass production conditions.

TABLE 5

| Amount of ZnO added (part(s) by weight) | Epoxy crosslinker (Amount added: 0.5 parts by weight) | | |
|---|---|---|---|
| | B | C | D |
| Tensile strength (MPa) n = 6 Ave. | 0 | 38.7 | 35.1 | 38.1 |
| | 0.5 | 39.8 | 42.1 | 40.1 |
| | 1.0 | 46.6 | 43.3 | 46.3 |
| Elongation at break (%) n = 6 Ave. | 0 | 595 | 589 | 558 |
| | 0.5 | 570 | 567 | 549 |
| | 1.0 | 580 | 563 | 559 |
| Fatigue durability (min) n = 3 Ave. | 0 | 2834 | 1520 | 971 |
| | 0.5 | 1521 | 1351 | 1160 |
| | 1.0 | 1342 | 1420 | 1273 |

Experimental Examples represented in Table 5 were changed in the amount of zinc oxide added, to 0, 0.5, and 1.0 part by weight, while the amount added in Table 3 was fixed to 1.0 part by weight. Three epoxy crosslinkers were used to prepare each cured film having a thickness of 80 μm. The tensile strength, the elongation at break, and the fatigue durability were measured, and the effect of the amount of zinc oxide added, on such physical properties, was studied. The film production conditions were the same as the conditions in Table 3.

It was consequently found that the initial tensile strength was retained by calcium and thus even an amount of 0 parts by weight of zinc oxide added allowed sufficient strength to be exhibited. An increase in the amount of zinc oxide added tended to result in an increase in tensile strength.

On the other hand, such a tendency was not observed with respect to the fatigue durability. However, it was found that required fatigue durability could be kept regardless of the amount of zinc oxide added. Zinc crosslinking is preferably made in order to prevent deterioration in tensile strength due to sweat, as the weakness of calcium crosslinking, resulting in an increase in chemical agent impermeability, in particular, impart required stress (N) at break to an ultrathin or thin film.

In Experimental Examples represented in Table 6, commercially available three XNBRs were used to prepare each film including XNBR (a) used in Table 3, and physical properties were confirmed.

In Experimental Examples 24 to 26, the same film having a thickness of 80 μm as in Table 3 was prepared with epoxy crosslinker B. The same production conditions as in Table 3 were adopted except that the gelling step was performed in conditions of 50° C. and 5 minutes.

It could be confirmed based on the above experiment results that a tri- or higher-valent epoxy crosslinker was used to thereby provide physical properties satisfying performances necessary for a glove, in particular, allow a glove excellent in fatigue durability to be produced even in the case of use of various XNBRs including an acrylonitrile residue in an amount of 27 to 36% by weight and an unsaturated carboxylic acid residue in an amount of 2.9 to 5.2% by weight, having a Mooney viscosity of 102 to 146, and having a MEK-insoluble fraction of 5.0 to 42.0% by weight.

FIG. 2 illustrates a relationship between the epoxy equivalent and the fatigue durability of each crosslinker in Table 3, regardless of a divalent or tri- or higher-valent epoxy crosslinker. The Figure indicates that a preferable epoxy equivalent in an amount of 0.5 parts by weight of an epoxy crosslinker added is 100 g/eq. to 200 g/eq., as described above. Furthermore, the Figure indicates that more excellent fatigue durability is exhibited in use of a tri- or higher-valent epoxy crosslinker than use of a divalent epoxy crosslinker. A too high epoxy equivalent causes a small number of epoxy groups contained in an epoxy crosslinker, and it is thus considered that the amount of the crosslinker added is needed to be further increased for the purpose of an increase in fatigue durability.

TABLE 6

| Experimental Example | XNBR Type | Epoxy crosslinker Type | Amount added (parts by weight) | Thickness (μm) | Tensile strength (MPa) n = 6 Ave. | Elongation at break (%) n = 6 Ave. | Fatigue durability (min.) n = 3 Ave. |
|---|---|---|---|---|---|---|---|
| 24 | (a) | B | 0.5 | 80 | 42.2 | 568 | 619 |
| 25 | (b) | B | 0.5 | 80 | 43.5 | 611 | 1712 |
| 26 | (c) | B | 0.5 | 80 | 39.7 | 590 | 898 |

TABLE 7

| Experimental Example | Gelling conditions | XNBR | Epoxy crosslinker Type | Epoxy crosslinker parts by weight | Amount of ZnO added parts by weight | Thickness μm | Tensile strength (MPa) n = 6 Ave. | Elongation at break (%) n = 6 Ave. | Fatigue durability (min.) n = 3 Ave. |
|---|---|---|---|---|---|---|---|---|---|
| 2 | 23° C. 30 seconds | (a) | B | 0.5 | 1 | 80 | 46.6 | 580 | 1342 |
| 24 | 50° C. 5 minutes | (a) | B | 0.5 | 1 | 80 | 42.2 | 568 | 619 |
| 25 | 50° C. 5 minutes | (b) | B | 0.5 | 1 | 80 | 43.5 | 611 | 1712 |
| 26 | 50° C. 5 minutes | (c) | B | 0.5 | 1 | 80 | 39.7 | 590 | 898 |
| 27 | 80° C. 5 minutes | (b) | B | 0.5 | 1 | 80 | 39.7 | 584 | 2203 |

TABLE 8

| Experimental Example | Gelling conditions °C. | Gelling conditions First | Gelling conditions Second | XNBR | Epoxy crosslinker Type | Epoxy crosslinker parts by weight | Amount of ZnO added parts by weight | Thickness μm | Tensile strength (MPa) n = 6 Ave. | Elongation at break (%) n = 6 Ave. | Fatigue durability (min.) Finger crotch n = 3 Ave. |
|---|---|---|---|---|---|---|---|---|---|---|---|
| 28 | 50 | 140 seconds | 85 seconds | (b) | C | 0.7 | 1.2 | 59 | 27.4 | 585 | 365 |
| 29 | 70 | 140 seconds | 85 seconds | (b) | C | 0.7 | 1.2 | 59 | 29.6 | 619 | 998 |
| 30 | 100 | 140 seconds | 85 seconds | (b) | C | 0.7 | 1.2 | 56 | 27.6 | 617 | 707 |

Experimental Examples represented in Table 7 and Table 8 were studied with respect to gelling step conditions in a process for producing an epoxy-crosslinked glove.

Experimental Examples represented in Table 7 produced each film having a thickness of 80 μm on a porcelain panel. Table 7 represents film properties in production under respective gelling step conditions adopted, of an ordinary temperature of 23° C.±2° C. in general, an ordinary temperature of 50° C. in a production plant, and also a temperature of 80° C. in heating in a gelling oven.

Experimental Examples represented in Table 8 produced each glove in a condition adopted in a gelling step, of a temperature of 50 to 100° C., in test production of an ultrathin glove having a thickness of 50 to 60 μm with a ceramic hand mold for actual use in glove production. Table 8 represents physical properties of the glove. The production conditions were almost the same as in Table 3 except for the descriptions in Table 7 and Table 8.

Each glove in Table 8 was subjected to measurement of the fatigue durability at a finger crotch. A finger crotch is the weakest portion of the glove, and the acceptance criterion is usually 90 minutes.

The measurement method of the fatigue durability at a finger crotch is as follows.

A straight line was drawn from a location between the second finger and the third finger of each glove to the cuff thereof, and the glove was cut along with the line. The glove was cut from the cuff toward the tip of the first finger until reaching a location of 50 mm from the tip of the first finger. The resultant was sandwiched by a fixed chuck at a location of 40 mm from the center of the finger crotch between the first finger and the second finger toward the tip of the first finger, and sandwiched by a movable chuck at a location of 95 mm from the center of the finger crotch toward the tip of the second finger, and the test piece was wound around and secured to a column of a test machine from a location of 35 mm from the center of the finger crotch in the cuff direction. A section of the test piece, from the center of the finger crotch to a height of 20 mm, was dipped in the artificial sweat liquid. The movable chuck was moved to a minimum position (relaxed state) of 170 mm (126%), retained for 11 seconds, and moved to a maximum position (elongated state) at which the length of the test piece was 225 mm (167%) and again moved to the minimum position (relaxed state) over 2.1 seconds, and such movements were defined as one cycle to perform a cycle test. The time for one cycle was 13.1 seconds, and was multiplied with the number of cycles until the test piece was broken, thereby providing the time as the fatigue durability (min.).

It was found from the above experiment results that an epoxy-crosslinked glove could be produced in a gelling step condition of a broad range from an ordinary temperature of 23° C. 2° C. to 100° C. for warming.

The time for the gelling step can be, for example, usually from 30 seconds up to 5 minutes, while being related to the temperature.

TABLE 9

| Experimental Example | Curing conditions | XNBR | Epoxy crosslinker Type | Epoxy crosslinker parts by weight | Amount of ZnO added part by weight | Gelling conditions Temperature (°C.) | Gelling conditions First (sec.) | Gelling conditions Second (sec.) | Tensile strength MPa | Elongation at break (%) | Fatigue durability (min.) n=3 Ave. |
|---|---|---|---|---|---|---|---|---|---|---|---|
| 31 | 70° C., 17 minutes | (b) | C | 0.5 | 1.0 | 80 | 140 | 85 | 30.6 | 599 | 457 |
| 32 | 90° C., 17 minutes | (b) | C | 0.5 | 1.0 | 80 | 140 | 85 | 31.8 | 631 | 535 |
| 33 | 110° C., 17 minutes | (b) | C | 0.5 | 1.0 | 80 | 140 | 85 | 30.7 | 584 | 1746 |
| 34 | 130° C., 17 minutes | (b) | C | 0.5 | 1.0 | 80 | 140 | 85 | 29.7 | 577 | 1743 |
| 35 | 150° C., 17 minutes | (b) | C | 0.5 | 1.0 | 80 | 140 | 85 | 33.1 | 597 | 1135 |

Experimental Examples represented in Table 9 were studied with respect to a temperature condition in a curing step in production of each epoxy-crosslinked glove. In production with double dipping of a glove having a thickness of around 60 μm with a ceramic hand mold for actual use in glove production, a curing step was performed in a condition of the change in temperature ranging from 70° C. to 150° C. for 17 minutes. Table 9 represents physical properties of each glove obtained. The gelling step conditions here were as represented in Table 9.

It can be seen from Experimental Examples in Table 9 that a temperature in the curing step, of 110° C. or higher, imparted particularly high fatigue durability, resulting in sufficient formation of epoxy crosslinking.

However, required fatigue durability was obtained even at a temperature in the curing step, of 70 to 90° C. A temperature in the curing step, of about 90° C., would impart sufficient crosslinking by use of XNBR high in water releasability.

Other production conditions were almost the same as in the conditions in Table 3.

The fatigue durability of each glove was measured at a palm part, and the acceptance criterion thereof was defined as 240 minutes being the same as in the porcelain panel film.

The invention claimed is:

1. A glove comprising a cured film of an elastomer containing a (meth)acrylonitrile-derived structural unit, an unsaturated carboxylic acid-derived structural unit, and a butadiene-derived structural unit in a polymer main chain, wherein the elastomer contains 20% by weight to 40% by weight of the (meth)acrylonitrile-derived structural unit, 1% by weight to 10% by weight of the unsaturated carboxylic acid-derived structural unit and 50% by weight to 75% by weight of the butadiene-derived structural unit, and has a crosslinked structure of a carboxyl group in the unsaturated carboxylic acid-derived structural unit with an epoxy crosslinker containing an epoxy compound having three or more epoxy groups in one molecule, wherein the epoxy crosslinker has an epoxy equivalent of 100 g/eq. or more and 200 g/eq. or less.

2. The glove according to claim 1, wherein the elastomer further has a crosslinked structure of the unsaturated car-

TABLE 10

| Experimental Example | Glove Weight (g) | Glove Thickness (μm) | XNBR | Epoxy crosslinker Type | Epoxy crosslinker parts by weight | Amount of ZnO added (part(s) by weight) | Gelling conditions Dipping (times) | Gelling conditions Temperature (°C.) | Gelling conditions Time (sec.) | Curing Temperature (°C.) | Curing Time (min.) | Tensile strength (MPa) | Elongation at break (%) | Fatigue durability (palm part) (min.) |
|---|---|---|---|---|---|---|---|---|---|---|---|---|---|---|
| 36 | 2.76 | 50 | (c) | C | 0.5 | 1 | 1 | 60 | 130 | 130 | 15 | 34.6 | 580 | 1018 |
| 37 | 3.01 | 58 | (e) | C | 0.5 | 1 | 1 | 50 | 120 | 130 | 20 | 37.8 | 579 | 1569 |
| 38 | 3.02 | 53 | (d) | C | 0.5 | 1.5 | 2 | 100 | (1)140 (2)85 | 130 | 17 | 32.2 | 581 | 1069 |
| 39 | 6.65 | 111 | (a) | C | 0.5 | 1 | 1 | 80 | 120 | 130 | 20 | 41.9 | 592 | 537 |

Experimental Examples represented in Table 3 and Tables represented thereafter were studied with respect to properties of each epoxy-crosslinked glove mainly in terms of a porcelain panel film having a thickness of 80 μm.

Experimental Examples represented in Table 10 produced each glove having a weight of about 2.7 g to 6.7 g with a ceramic hand mold for actual use in glove production.

As a result, a glove having a thickness of 50 μm and a weight of 2.7 g was obtained which was ultrathin and which had required performances, such properties being not achieved in any XNBR gloves obtained with a conventional sulfur-based vulcanization accelerator.

Experimental Example 39 was an example of a glove having a thickness of more than 80 μm.

boxylic acid-derived carboxyl group with calcium derived from a coagulant, and a crosslinked structure of such a carboxyl group with zinc and/or aluminum derived from a metal crosslinker.

3. The glove according to claim 1, wherein the epoxy compound is an epoxy compound having three or more glycidyl ether groups in one molecule.

4. The glove according to claim 1, wherein the epoxy crosslinker has an average number of epoxy groups of more than 2.0.

5. The glove according to claim 1, wherein the cured film has a thickness of 40 μm to 300 μm.

6. The glove according to claim 1, wherein the cured film has a fatigue durability of 240 minutes or more and the cured film has a tensile strength of 20 MPa or more, according to the following test methods:

fatigue durability test method: comprising preparing a No. 1 dumbbell test piece according to JIS K6251, having a length of 120 mm, from the cured film, and repeating pulling of an upper portion of the test piece with a lower portion of the test piece being secured and dipped to a length of 60 mm in an artificial sweat liquid, and expansion and contraction of the resultant between a maximum of 195 mm and a minimum of 147 mm over 12.8 seconds in a longitudinal direction, thereby measuring a time until breakage of the test piece; and tensile strength test method: comprising cutting out a No. 5 dumbbell test piece according to JIS K6251, from the cured film, and measuring a tensile strength (MPa) with TENSILON universal tensile testing machine RTC-1310A manufactured by A&D Co., Ltd., at a test speed of 500 mm/min., a distance between chucks of 75 mm and a distance between marked lines of 25 mm.

7. A method for producing a glove, comprising (1) a step of dipping a glove mold in a calcium ion-containing coagulant liquid to attach the coagulant to the glove mold, (2) a step of dispersing and uniforming a composition for dip molding with stirring (maturation step), wherein the composition for dip molding comprises an elastomer containing an (meth)acrylonitrile-derived structural unit, an unsaturated carboxylic acid-derived structural unit, and a butadiene-derived structural unit in a polymer main chain, an epoxy crosslinker, water, and a pH adjuster, and having an adjusted pH of 9.0 or more, wherein the elastomer contains 20% by weight to 40% by weight of the (meth)acrylonitrile-derived structural unit, 1% by weight to 10% by weight of the unsaturated carboxylic acid-derived structural unit, and 50% by weight to 75% by weight of the butadiene-derived structural unit, and the epoxy crosslinker is an epoxy crosslinker containing an epoxy compound having three or more epoxy groups in one molecule, wherein the epoxy crosslinker has an epoxy equivalent of 100 g/eq. or more and 200 g/eq. or less, (3) a dipping step of dipping the glove mold to which the coagulant is attached according to (1), in the composition for dip molding which undergoes step (2), to coagulate the composition for dip molding on the glove mold, thereby forming a film, (4) a step of gelling the film formed on the glove mold to produce a cured-film precursor, the step being a gelling step of leaving the film to still stand in conditions of a temperature of 21° C. to 120° C. and 20 seconds or more, (5) a leaching step of removing impurities from the cured-film precursor formed on the glove mold, (6) a beading step of producing a wind on a glove cuff portion after the leaching step, and (7) a curing step of finally heating and drying the cured-film precursor at 70° C. or higher and 150° C. or lower for 10 minutes to 30 minutes, to provide a cured film, wherein steps (3) to (7) are performed in the recited order.

8. The method for producing a glove according to claim 7, wherein steps (3) and (4) are repeated twice in the recited order.

9. The method for producing a glove according to claim 7, further comprising a pre-curing step of heating and drying the cured-film precursor at a temperature lower than the temperature in step (7), between steps (6) and (7).

* * * * *